Oct. 24, 1967    A. G. REYNOLDS ETAL    3,348,619
ROTARY TILLER
Filed Aug. 31, 1964                 2 Sheets-Sheet 2
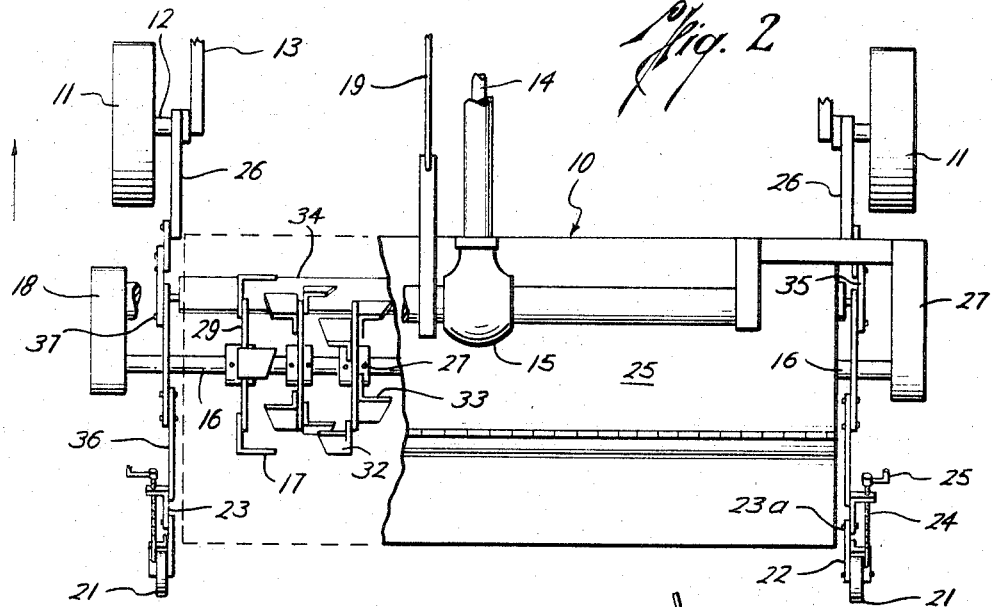
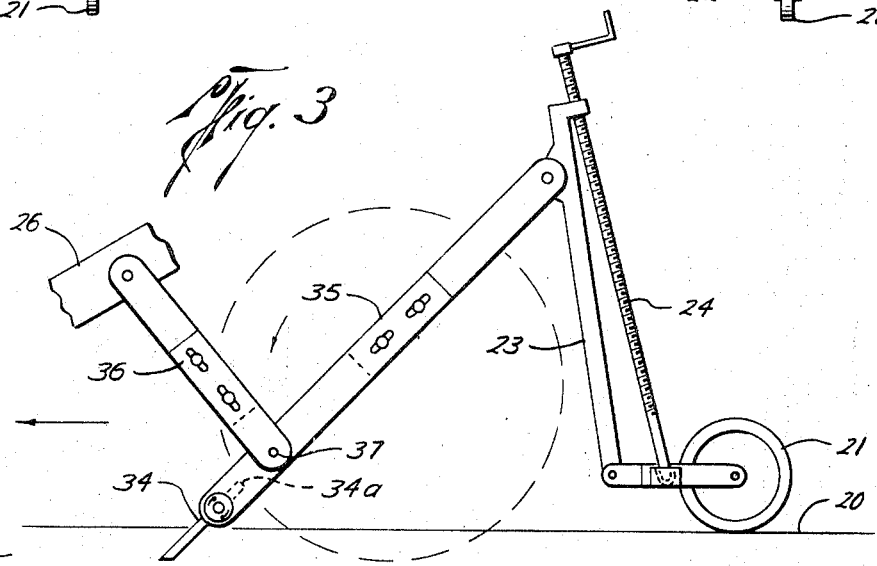
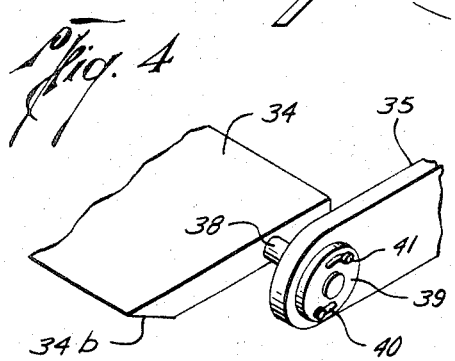
Aaron G. Reynolds
Eugene R. Reynolds
INVENTORS
BY Browning, Simms, Hyer & Eickenroht
ATTORNEYS United States Patent Office 3,348,619
Patented Oct. 24, 1967

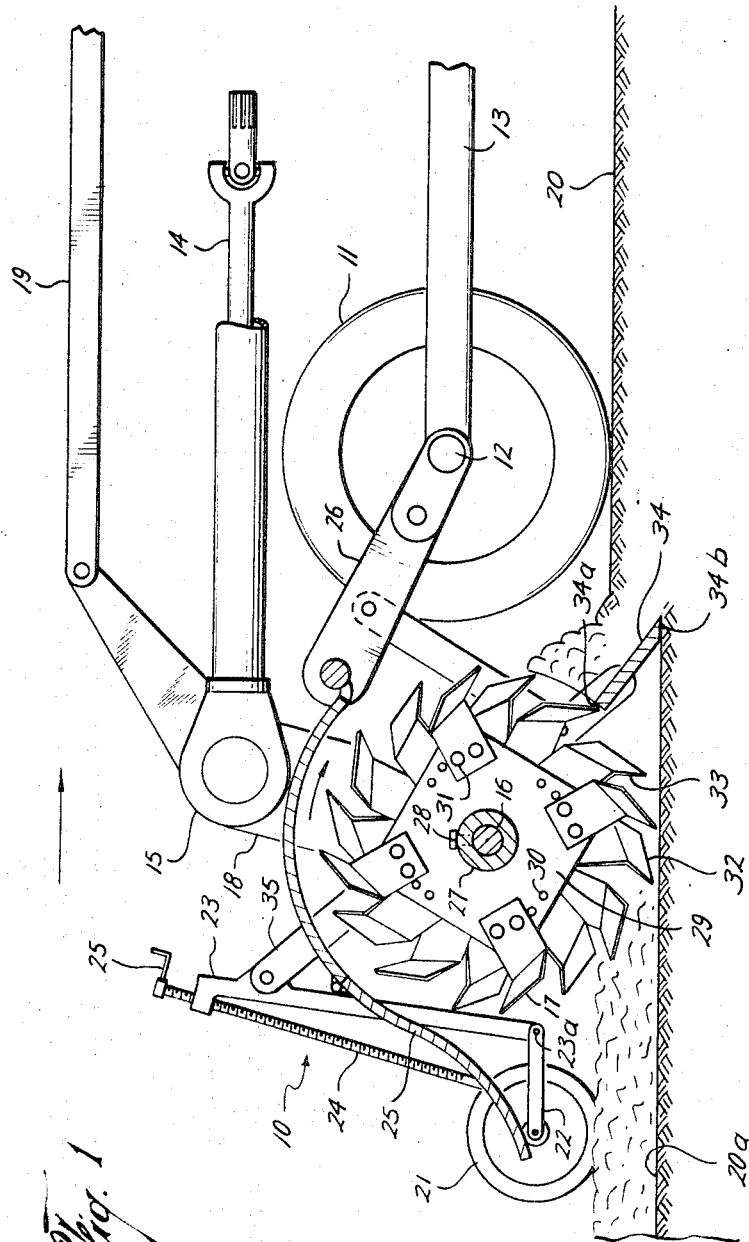

3,348,619
ROTARY TILLER
Aaron G. Reynolds and Eugene R. Reynolds, McAllen, Tex., assignors to Reynolds Research & Manufacturing Corporation, McAllen, Tex.
Filed Aug. 31, 1964, Ser. No. 393,118
8 Claims. (Cl. 172—66)

ABSTRACT OF THE DISCLOSURE

A rotary tiller including a frame movable over the ground surface and have a laterally extending shaft on which blades are supported. Each blade has a laterally extending flange with a cutting edge, and the shaft is rotated to move the blades rearwardly as their cutting edges pass into through the soil beneath the ground surface. A fixed blade extends across the frame parallel to the shaft and tilts downwardly and forwardly with respect to the frame from its upper to its lower edge. The lower edge of the blade is at a level beneath the lowermost path of the ground working elements, and the upper edge of the blade is substantially adjacent to the path of the ground working elements at a point intermediate their forwardmost and lowermost paths.

---

This invention relates generally to soil tillage implements and, more particularly, to improvements in rotary tillers which are designed not only to loosen the soil, but also to mix weeds and other trash on the ground surface with the loosened soil.

In an implement of this type, blades are spaced along a rotatable shaft extending laterally across a frame which is adapted to be moved forwardly over the ground surface. The frame includes means for raising and lowering the shaft relative to the ground surface, and each such blade has a laterally extending cutting edge for slicing into and through the soil as the shaft is rotated. More particularly, the shaft is rotated in a direction to move such cutting edges rearwardly as they slice through the soil, so as to discharge the loosened soil behind them. In a preferred form of this type of implement, the blades are spaced uniformly along the length and about the circumference of the shaft. This arrangement is helpful in maintaining the power requirements of the implement relatively constant and also in working the soil uniformly.

The weeds and other trash on the ground surface are bent over by the downwardly and rearwardly moving blades and then chopped into pieces as they are forced down against firm soil beneath the ground surface. Obviously, each succeeding blade will progressively chop the weeds and trash and mix them into the loosened soil.

One serious problem which has been encountered in the use of this type of tillage implement is the excessive blade wear which results from the tremendous force which is placed on the cutting edges of the blades as they slice into the soil. This wear not only necessitates that the blades be fabricated by expensive procedures such as heat-treating and hard-surfacing, but also that they be replaced rather often.

The wear on the blades is even greater as they penetrate deeper into the soil, as is required in many instances in order to reach a depth at which the soil provides a sufficiently firm base for chopping the weeds and other trash. Apart from the problem of wear, deep penetration is often undesirable since it is preferable in many agricultural systems to mix trash to a relatively shallow depth in order to control surface erosion and crusting.

In order to perform the desired work, the blades are rotated at a speed which causes their cutting edges to move through the soil faster than the ground speed of the implement. This, of course, places a limit on the forward speed of the implement for any given optimum blade speed.

An object of this invention is to provide a rotary tiller of the type above described which is able to operate at normal speeds with considerably less wear on its rotating blades.

Another object is to provide a rotary tiller of the character above described which is capable of effectively mixing chopped weeds with a shallower layer of loosened soil than has heretofore been possible.

A further object is to provide such a rotary tiller in which the speed of the rotating blades may be selected independently of the ground speed of the implement, so that they may be rotated for moving their cutting edges through the soil at a greater or lesser speed than the implement, as conditions warrant.

These and other objects are accomplished, in accordance with the illustrated embodiment of the invention, by improvements in a rotary tiller of the type above described including a blade which extends across the frame parallel to the shaft and forwardly of the lowermost path of the rotating blades and which is fixed relative to such rotating blades during operation of the implement. More particularly, this fixed blade tilts downwardly and forwardly with respect to the frame from its upper to its lower edge to dispose such lower edge at the level below the lowermost path of the blades. Thus, the fixed blade severs a wide layer of soil forwardly of the rotating blades and thereby does a great amount of the work otherwise done by the rotating blades in loosening firm soil. Consequently, the wear on the rotating blades is reduced by the loosening action of the fixed blade. Further reduction of wear may result from a slower rotation of the blades relative to ground speed.

The upper edge of the fixed blade is close to the path of the rotating blades at a point intermediate their forwardmost and lowermost paths of movement. Thus, the rotating blades will shear off segments of the moving layer of soil as well as the trash delivered to them by the fixed blade as such rotating blades move downwardly and rearwardly past the adjacent upper edge of the blade. This will have the effect of clearing the fixed blade of accumulated soil which otherwise would result from very shallow operation. Consequently, the improved rotary tiller of this invention permits the operator to till the soil to lesser depths than is possible with the conventional implement. This not only cuts down on the amount of wear on the blades, but also enables the chopped weeds to be mixed with a shallower layer of loosened soil.

In the illustrated embodiment of the invention, there is a means for moving the upper edge of the fixed blade to adjust its position intermediate the forwardmost and lowermost paths of movement of the rotating blades. There is also a means for adjusting the angle of tilt of the fixed blade so as to obtain the desired force reactions as the lower edge of such blade cuts through the soil.

In the preferred form of the invention, the fixed blade is carried on an arm which is mounted on the frame for swinging about a transverse axis upwardly and rearwardly of the axis of rotation of the shaft for the rotating blades. Normally, the arm is held in a fixed position so as to preposition the upper edge of the fixed blade relative to the path of the rotating blades. However, the means for so holding the fixed blade is releasable, in the event the fixed blade engages a relatively immovable object, to permit it to swing on said arm beneath the lowermost path of the rotating blades.

This arm is held in its normal position by another arm which is mounted on the frame for swinging about a transverse axis forwardly of the axis of swinging of the first arm. The free ends of these arms are connected to one another, and the fixed blade is carried by one of them in the position previously described. More particularly, a means is provided for adjusting the effective length of each arm intermediate the axis about which it swings and its connection to the other arm to permit the position of the upper edge of the fixed blade relative to the path of the rotating blades to be adjusted, and the means for so connecting the arms comprises a pin which is shearable so as to permit the fixed blade to swing on the first arm downwardly and rearwardly about the path of movement of said rotating blades, again as previously described.

In the drawings, wherein like reference characters are used throughout to designate like parts;

FIG. 1 is a side elevational view of a rotary tiller embodying the improvements of the present invention;

FIG. 2 is a top view of the rotary tiller of FIG. 1, but on a smaller scale and with a portion thereof broken away to show the rotating blades as well as the fixed blade extending laterally across the frame;

FIG. 3 is a view of the fixed blade and the arms for supporting same, as seen from the side of the tiller opposite to that shown in FIG. 1; and, FIG. 4 is an enlarged perspective view of the means for adjusting the angle of tilt of the fixed blade.

With reference now to the details of the above-described drawings, the rotary tiller, which is designated in its entirety by reference character 10, includes a frame having transport wheels 11 on opposite sides thereof for moving over ground surface 20. Each such wheel is mounted on an axle 12 connected to a forwardly extending drawbar 13 attachable in any suitable manner to a vehicle (not shown) for towing the frame from left to right in FIG. 1. The frame also includes a drive shaft 14 connectable through a universal joint at its forward end to a power takeoff on the towing vehicle and to a transmission 15 at its rear end. One end of a lateral shaft from the transmission is in turn connected by means of a chain or the like within housing 18 to a laterally extending shaft 16 upon which blades 17 are carried. The transmission and thus the shaft 16 is raised and lowered by means of an arm 19 extending forwardly to any suitable hydraulic mechanism on the towing vehicle. Thus, in a manner well known in the farm implement art, the shaft 16 and thus the blades 17 carried on it may be raised and lowered with respect to the ground surface 20.

The frame also carries a gauge wheel 21 on each side thereof for supporting the rear end of the frame by moving over the ground surface 20 at each side of the layer of soil which is loosened by the blades 17. As can be seen from the drawings, each such gauge wheel is mounted on an axle carried by a forwardly extending arm 22 on the lower end of a substantially vertical support 23 member of the frame. More particularly, arm 22 and support 23 are pivotally connected by pin 23a, and a threaded shaft 24 extends between them for raising and lowering the level of the gauge wheel 21 upon rotation of a handle 25 at the upper end of such shaft.

As the frame moves forwardly from left to right in FIG. 1, and the blades 17 are rotated in a clockwise direction, as indicated by the arrow of FIG. 1, they slice into the soil beneath ground surface 20 to loosen it and return it to the trench 20a from which it was removed, in a manner to be described as follows. There is a shroud 25 which extends over the uppermost path of the rotating blades and then downwardly and rearwardly with respect thereto, as shown in FIG. 1, so as to substantially confine the loosened soil which is flung rearwardly by the blades and thereby return it to the trench. This shroud may be mounted on the frame in any suitable manner, such as by welding to the rear end of an arm 26 extending rearwardly from axle 12 for each of the transport wheels 11.

As shown in FIG. 2, shaft 16 extends laterally across the frame between the lower end of housing 18 at one side and the lower end of bearing 27 on the other side. The bearing is in turn supported from an outward extension of the housing about the drive shaft extending laterally from transmission 15.

As in conventional rotary tillers of this type, the blades 17 are mounted in uniformly spaced apart groups along the length of the shaft 16, and the blades of each group are uniformly spaced apart about the circumference thereof. More particularly, and as shown in FIGS. 1 and 2, the blades of each are carried about the periphery of a plate 29 releasably secured to the shaft by a collar 27 and set screw 28. As shown in FIG. 1, this plate has a series of holes 30 therein to permit the blades 17 to be removably mounted thereon by bolts 31. In the illustrated embodiment of the invention, each rotating blade 17 is L-shaped and includes a laterally extending flange 32 having a cutting edge 33 adapted to slice into and through soil beneath the ground surface 20.

As previously described, and in accordance with the improvements of the present invention, a fixed blade 34 extends parallel to the shaft and laterally across the frame from one side to the other. More particularly, the fixed blade tilts forwardly and downwardly from its upper edge 34a to its lower edge 34b so as to slice into the soil beneath the ground surface 20. Thus, it severs a layer of same of a width corresponding to the length of the blade and delivers such layer rearwardly to the rotating blades 17.

As can be seen from FIG. 1, and as previously described, the lower edge 34b of fixed blade 34 is beneath the lowermost path of the rotating blades 17 so that the only work which the rotating blades need perform is in chopping the severed layer during their rotation and forward movement of the frame. As will be appreciated from an examination of FIG. 1, the fixed blade 34 will sever this layer to a uniform depth, so that the resulting layer of loosened soil, which is shown behind the rotating blades and within the trench, will also be of substantially uniform depth.

The upper edge 34a of the fixed blade 34 is disposed substantially adjacent to the downwardly and rearwardly directed paths of the rotating blades 17. In this manner, the rotating blades will, in effect, shear off segments of the severed layer as they engage the top of the layer and move downwardly through it and across the upper edge 34a of fixed blade 34. As the rotating blades continue past the edge 34a, they will further chop up and thereby further divide the segments of the severed layer into loosened soil.

As previously described, the rotating blades also function to cut the weeds and other trash on top of the severed layer as such rotating blades move past edge 34a. More importantly, in combination with the edge 34a, they chop up this trash with a shearing action, and thus without regard to the firmness of the soil in trench 20a. Thus, it is possible for the operator not only to rotate the blades 17 at a speed independent of the ground speed of the implement, but also to raise or lower the rotating blades as he desires in relation to the fixed blade 34.

As best shown in FIGS. 1 and 3, the fixed blade 34 is mounted on the lower end of a forwardly and downwardly extending arm 35 which is pivotally connected at its upper end to frame support member 23. This arm, and thus the blade 34, are held in a predetermined position with respect to the circular path of the rotating blades (indicated by broken lines in FIG. 3) by means of another arm 36 pivotally connected at its upper end to arm 26 and extending downwardly and rearwardly therefrom for connection to an intermediate portion of arm 35 by means of shear pin 37.

As will be understood by those skilled in the art, it may be desirable to move the upper edge 34a of fixed blade 34 between different positions about the circular path of movement of the rotating blades. That is, this upper edge may function better for the purposes described when it is either nearer or farther from the forwardmost path of movement of the rotating blades. In order to permit this adjustment, each of the arms 35 and 36 is formed in two parts which are connected together by slots and releasable pins as shown in FIG. 3, so as to permit the portion of each above the shear pin 37 to be lengthened or shortened. For example, upon lengthening the effective dimension of arm 35 and shortening the effective dimension of arm 36, the upper edge 34a of fixed blade 34 is caused to move upwardly toward the forwardmost path of the rotating blades.

As can be seen from FIGS. 1 and 3, the pivotal connection of the arm 35 to support member 23 is disposed upwardly and rearwardly of the axis of rotation of shaft 16, while the pivotal connection of arm 36 to arm 26 is located forwardly of such pivotal connection of arm 35. More particularly, the pivotal axis of arm 35 is so arranged that a line through it and the fixed blade 34 will pass at least close to the axis of rotation of shaft 16. Thus, in the event the blade 34 strikes a large rock or other immovable object, and the pin 36 is sheared, the upper edge of the blade 34 is free to swing beneath the lowermost path of the rotating blades and thus not damage them or other parts of the rotary tiller.

As shown in FIG. 3, the fixed blade 34 has a shaft 38 on its ends to permit adjustment of its angle of tilt. Thus, each end of such shaft extends through its adjacent arm 35 and has a disc 39 with slots 40 to receive pins 41 in the arm. Upon adjustment of the pins 41, the blade 34 may be tilted through the range of the slots 40 so as to dispose the lower edge 34b thereof at the desired angle of attack.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In a rotary tiller, including a frame movable forwardly over the ground surface, a shaft extending laterally across the frame and having groundworking elements spaced therealong, and means for rotating the shaft to move said groundworking elements rearwardly as they pass into and through the soil beneath the ground surface; the improvement which comprises a fixed blade extending across the frame parallel to the shaft and tilting downwardly and forwardly with respect to the frame from its upper to its lower edge, said lower edge being at a level below the lowermost path of said groundworking elements so as to sever and deliver a layer of said soil to said groundworking elements as the frame moves forwardly, said upper edge being substantially adjacent to the path of the groundworking elements at a point intermediate their forwardmost and lowermost paths, and said groundworking elements comprising blades each of which has a cutting edge which extends substantially parallel to the upper edge of the fixed blade for shearing off segments of the layer of soil delivered thereto as said cutting edge moves downwardly and rearwardly past the upper edge of the fixed blade.

2. In a rotary tiller of the character defined in claim 1, means for releasing the fixed blade to permit it to swing beneath the lowermost path of the moving blades in the event the fixed blade engages a relatively immovable obstruction.

3. In a rotary tiller of the character defined in claim 1, means for pivoting the fixed blade about an axis intermediate its upper and lower edges so as to adjust its angle of tilt.

4. In a rotary tiller, including a frame, means supporting the frame for movement forwardly over the ground surface, a shaft extending laterally across the frame, a plurality of groundworking elements carried by the shaft in laterally and circumferentially spaced apart relationship, means for raising and lowering the shaft relative to the ground surface, and means for rotating the shaft so as to move said groundworking elements in a direction opposite to that of the frame during their lowermost path of movement; the improvement which comprises, a first arm mounted on the frame for swinging about a transverse axis rearwardly and above the shaft, a second arm mounted on the frame for swinging about another transverse axis forwardly of the first-mentioned axis, means connecting the arms to one another, a blade fixedly carried on one of said arms for extension laterally across the frame and tilting downwardly and forwardly with respect to the frame from its upper to its lower edge so as to sever and deliver a layer of said soil to the groundworking elements as the frame moves forwardly, said lower edge being at a level below the lowermost path of said groundworking elements and said upper edge being substantially adjacent the path of said groundworking elements at a point intermediate their forwardmost and lowermost paths, and means for adjusting the effective length of each arm intermediate the axis about which it swings and its connection to the other arm, so as to permit the positioning of the upper edge of the fixed blade relative to the forwardmost and lowermost paths of the groundworking elements to be adjusted.

5. In a rotary tiller, including a frame, means supporting the frame for movement forwardly over the ground surface, a shaft extending laterally across the frame, a plurality of groundworking elements carried by the shaft in laterally spaced apart and circumferentially staggered relationship, means for raising and lowering the shaft relative to the ground surface, and means for rotating the shaft so as to move said groundworking elements in a direction opposite to that of the frame during their lowermost path of movement; the improvement which comprises a first arm mounted on the frame for swinging about a transverse axis rearwardly and above said shaft, a second arm mounted on the frame for swinging about another transverse axis forwardly of the first-mentioned axis, means connecting the arms to one another, and a blade fixedly carried on said first arm for extension laterally across the frame and tilting downwardly and forwardly with respect to the frame from its upper to its lower edge so as to sever and deliver a layer of said soil to the groundworking elements as the frame moves forwardly, said lower edge being at a level below the lowermost path of said groundworking elements said upper edge being substantially adjacent to the path of said groundworking elements at a point intermediate their forwardmost and lowermost paths, and said connecting means being releasable to permit said fixed blade to swing on said first arm downwardly and rearwardly about the path of said groundworking elements.

6. In a rotary tiller, including a frame movable forwardly over the ground surface, a shaft extending laterally across the frame and having groundworking elements spaced therealong, and means for rotating the shaft to move said groundworking elements rearwardly as they pass into and through the soil beneath the ground surface; the improvement which comprises a blade, an arm on the frame mounting said blade for swinging about a transverse axis, means holding said arm so as to dispose the blade in a fixed position extending across the frame parallel to the shaft and tilting downwardly and rearwardly with respect to the frame from its upper to its lower edge, said lower edge being at a level beneath the lowermost path of the groundworking elements so as to sever and deliver a layer of said soil to said groundworking elements as the frame moves forwardly, said upper edge being substantially adjacent to the path of the groundworking elements at a point intermediate their forwardmost and lowermost paths, and said holding means being releasable to permit the fixed blade to swing on said arm beneath the lowermost path of the groundworking elements in the event said fixed blade engages a relatively immovable obstruction.

7. In a rotary tiller, including a frame movable forwardly over the ground surface, a shaft extending laterally across the frame and having groundworking elements spaced therealong, and means for rotating the shaft to move said groundworking elements rearwardly as they pass into and through the soil beneath the ground surface; the improvement which comprises a fixed blade extending across the frame parallel to the shaft and tilting downwardly and forwardly with respect to the frame from its upper to its lower edge, said lower edge being at a level below the lowermost path of said groundworking elements so as to sever and deliver a layer of said soil to said groundworking elements as the frame moves forwardly, said upper edge being substantially adjacent to the path of the groundworking elements at a point intermediate their forwardmost and lowermost paths, and means for moving the upper edge of the fixed blade to adjust its position intermediate the forwardmost and lowermost paths of the groundworking elements while maintaining it substantially adjacent to the path of the groundworking elements.

8. In a rotary tiller, including a frame movable forwardly over the ground surface, a shaft extending laterally across the frame and having groundworking elements spaced therealong, and means for rotating the shaft to move said groundworking elements rearwardly as they pass into and through the soil beneath the ground surface; the improvement which comprises a fixed blade extending across the frame parallel to the shaft and tilting downwardly and forwardly with respect to the frame from its upper to its lower edge, said lower edge being at a level below the lowermost path of said groundworking elements so as to sever and deliver a layer of said soil to said groundworking elements as the frame moves forwardly, said upper edge being substantially adjacent to the path of the groundworking elements at a point intermediate their forwardmost and lowermost paths, means for moving the upper edge of the fixed blade to adjust its position intermediate the forwardmost and lowermost paths of the groundworking elements, and means for adjusting the angle of tilt of the fixed blade.

References Cited
UNITED STATES PATENTS

| | | | |
|---|---|---|---|
| 2,150,304 | 3/1939 | Warta | 172—271 |
| 2,675,748 | 4/1954 | Patterson | 172—66 |
| 2,893,499 | 7/1959 | Shollemberger | 172—740 |
| 2,968,354 | 1/1961 | Berry | 172—67 X |

FOREIGN PATENTS 827,999    2/1960    Great Britain.

ABRAHAM G. STONE, *Primary Examiner.*

WILLIAM A. SMITH III, *Examiner.*

J. R. OAKS, *Assistant Examiner.*